United States Patent
Derakhshan

[11] Patent Number: 5,136,933
[45] Date of Patent: Aug. 11, 1992

[54] ROTARY ORBITAL ROTISSERIE

[76] Inventor: Soheyl Derakhshan, 5355 Pacifica Dr., San Diego, Calif. 92109

[21] Appl. No.: 642,863

[22] Filed: Jan. 18, 1991

[51] Int. Cl.⁵ ............................................ A47J 37/04
[52] U.S. Cl. ...................................... 99/421 P; 99/427; 99/443 R; 475/5; 475/8
[58] Field of Search ............... 99/419, 420, 421 R, 99/421 H, 421 P, 421 V, 427, 443 R, 421 M, 421 HV; 126/25 AA, 41 B, 41 A; 475/1, 5, 6, 8; 74/462

[56] References Cited

U.S. PATENT DOCUMENTS

| | | | |
|---|---|---|---|
| 2,012,702 | 8/1935 | Zolotas | 99/421 P |
| 3,125,015 | 3/1964 | Schlaegel | 99/421 P |
| 3,196,776 | 7/1965 | Norton | 99/421 P |
| 3,321,982 | 5/1967 | Maunus et al. | 99/421 M |
| 3,372,636 | 3/1968 | Marasco | 99/443 R |
| 4,112,782 | 9/1978 | Mullins | 74/462 |
| 4,158,992 | 6/1979 | Malafouris | 99/421 HV |

FOREIGN PATENT DOCUMENTS

| | | | |
|---|---|---|---|
| 584803 | 10/1959 | Canada | 99/421 P |
| 1162985 | 2/1964 | Fed. Rep. of Germany | 99/421 P |
| 2425346 | 12/1975 | Fed. Rep. of Germany | 99/421 P |
| 2641126 | 3/1978 | Fed. Rep. of Germany | 99/421 P |
| 2389356 | 1/1979 | France | 99/421 H |
| 590909 | 4/1959 | Italy | 99/421 P |

Primary Examiner—Harvey C. Hornsby
Assistant Examiner—Mark Spisich
Attorney, Agent, or Firm—Ralph S. Branscomb

[57] ABSTRACT

A rotary orbital rotisserie has a rack structure for skewering chickens and other meat to be barbecued or roasted, with the individual spits of the rotisserie being not only rotational about their own axes, but orbital around the main rotisserie axis as well, so that the chickens execute a planetary motion. The spits can be maintained non-orbital and merely rotated in another mode of operation.

3 Claims, 2 Drawing Sheets

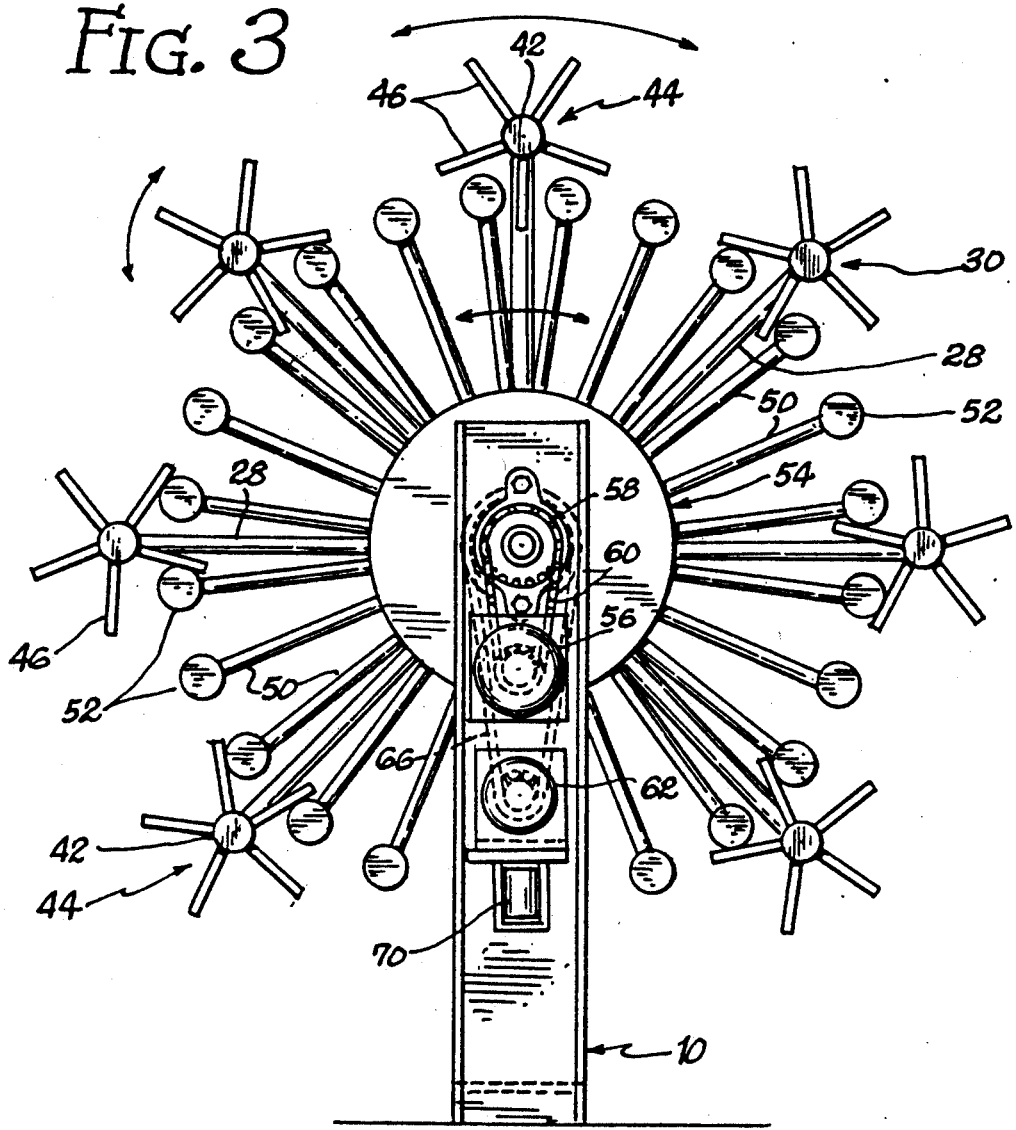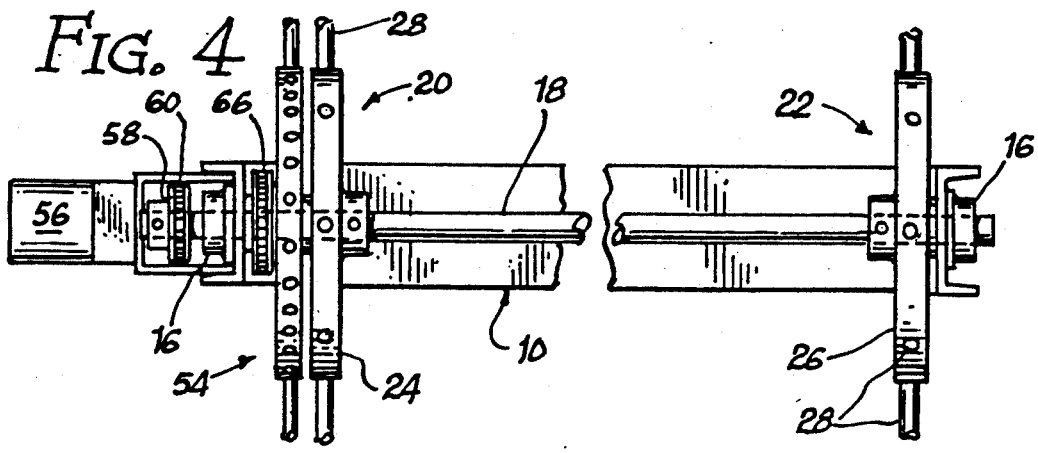

ROTARY ORBITAL ROTISSERIE

BACKGROUND OF THE INVENTION

The popularity of restaurants and food stands which rotate meat on some kind of rotisserie probably extends to every country in the world. Some meat is roasted Greek-style, on a single vertical skewer which rotates about its vertical axis alongside a vertical wall of charcoal or gas-fired ceramic radiating embers. These units ordinarily skewer a multiplicity of layers of meat which are then shaved off so that the meat continually rotates to expose fresh meat for brazing as the mass of meat continues to become reduced in diameter as it is shaved further and further.

Another kind of rotating rotisserie/barbecue device is generally used to cook whole chickens, but can be used to cook other kinds of meat or parts of chickens as well. Typically this unit is formed of a pair of spaced hubs having spokes which carry spits between their ends, from one hub member to the next, with the hubs rotating so that the spits, which are generally 6 or 8 in number, sequentially pass slowly across the face of a vertical charcoal wall or other barbecue element. This is the type of barbecue described in the instant disclosure. As the spits pass across the face of the barbecue, some rotate as well as executing their orbiting motion, but most do not. The ones that do not, create areas of overcooking and undercooking in the chickens, and the ones that do rotate are often rather inflexible in their design, meaning that they will always rotate when they orbit. Or, they may be prone to clogging and malfunction due to the hot and often dirty environment in which they operate.

There is a need for a simple, sure mechanism for rotating and simultaneously orbiting barbecue spits which simultaneously provides the flexibility to cause rotation without orbiting as well as with orbiting, and to make possible reverse-orbiting of the spits.

SUMMARY OF THE INVENTION

The instant invention fulfills the above stated need by providing a simple device mounted on a single frame, with one end of the frame mounting an idling orbital member, and the other end of the frame mounting the driven portion.

At the driven end, an orbital member has a hub with eight radial spokes which mount rotators at their ends. A second, trip member also has a hub and spokes with the ends of the spokes tripping the rotators as the two hubs revolve in mutual rotation, such that the spokes of the trip member rotate the rotators. The rotators in turn have a pin wheel or paddle arrangement which positively engages the tips of the trip member spokes to cause a sure-fire, simple and easy-to-clean rotation mechanism for the rotors as they orbit.

BRIEF DESCRIPTION OF THE DRAWINGS

FIG. 3 is an end elevation view of the rotisserie with portions shown in phantom; and, FIG. 4 is a top plan view of the invention.

DETAILED DESCRIPTION OF THE PREFERRED EMBODIMENT

Figure 1:
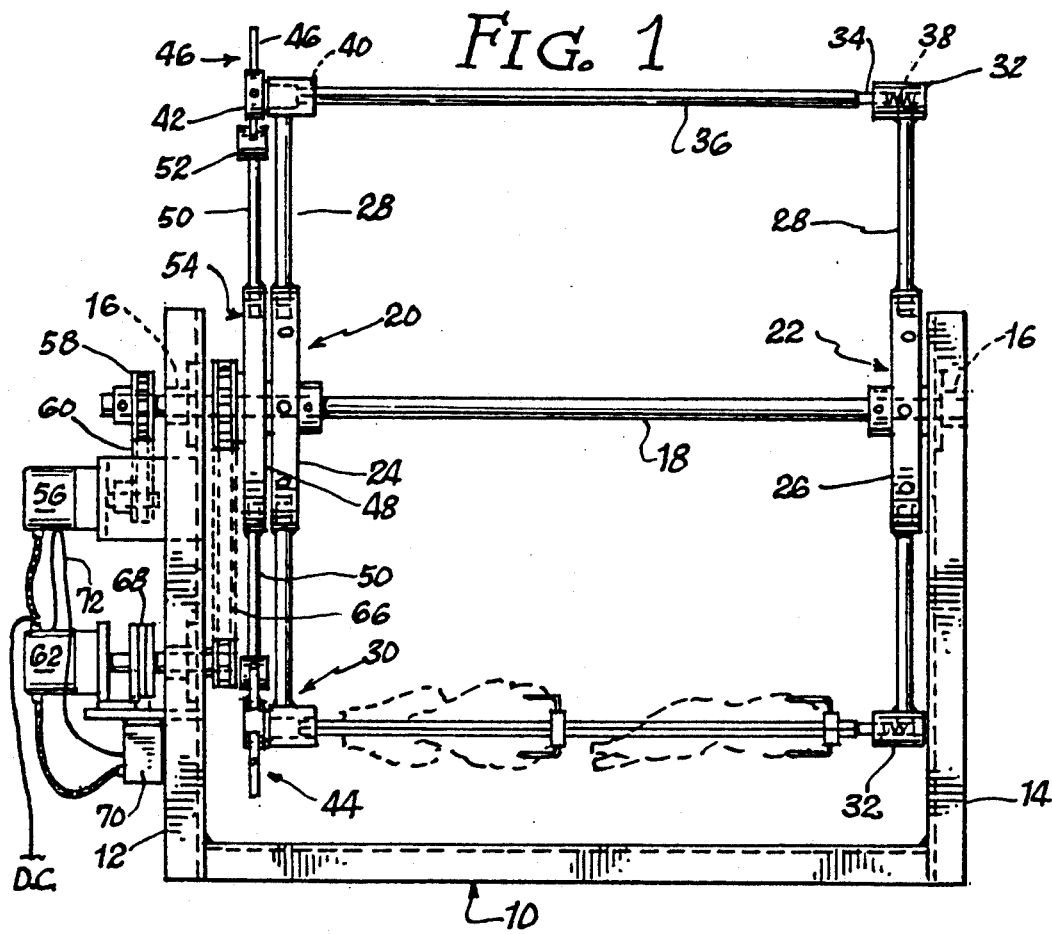
FIG. 1 is a front elevation view of the rotisserie in use with certain interior portions shown in phantom.
Figure 2:
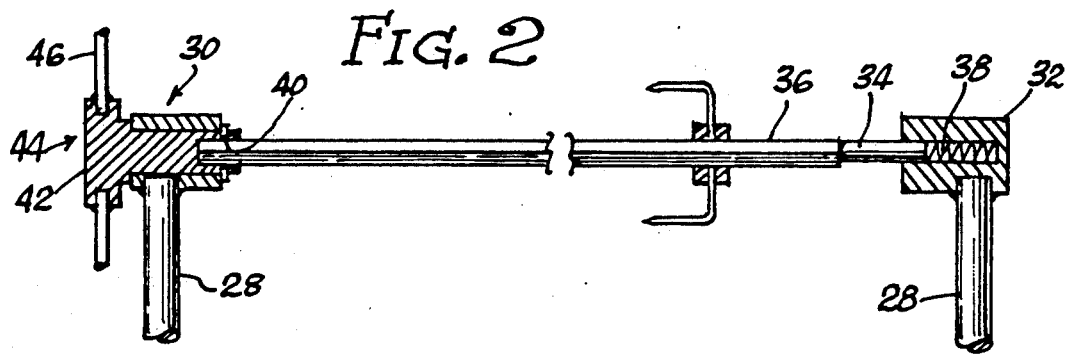
FIG. 2 is a detail partly in section illustrating the manner in which a spit engages in the spit support structure.

The rotisserie is based on a frame 10 which is somewhat diagrammatically illustrated and is generally formed of U-shaped channels of stainless steel or plated steel. It has first and second upright members 12 and 14, each of which defines a ball bearing journal 16 which journal a main shaft 18 which defines the frame axis. Rigidly mounted on the main shaft to be rotated therewith is a first orbital member 20 and a second orbital member 22. These members each have hubs 24 and 26 and spokes 28 which extend radially from the hub. The first member 20 mounts a rotator 30 at the end of each spoke, while the second orbiter member 22 mounts a spring-loaded socket 32 which will rotationally mount the round end 34 of the square spit 36, which is easily loadable by pressing the rounded end into the socket against the spring 38 as shown in FIGS. 1 and 2, before inserting the other end of the spit into the square socket 40 of the rotator 30. The spokes and much of the other structure are made of nickle-plated steel, and could alternatively be made of stainless steel.

The rotator has its own smaller hub 42 which forms a pinwheel 44 with radial arms 46.

Freewheeling on the main shaft 18 is yet another hub 48 of a trip member which also has spokes 50 which terminate in cylindrical tips 52 which trip the radial arms 46 of the pinwheels 44 as the trip member 54 and the first orbital member 20 rotate relative to one another. In the preferred embodiment, the cylindrical tips 52 comprise aluminum cylinders with copper bushings.

Rotation of the main shaft is achieved by means of a first motor 56 which engages the shaft sprocket 58 with a chain 60. Rotation of the trip member 54 is achieved by virtue of a second motor 62, with its associated chain and sprocket 66, which are treated summarily here as they are extremely standard forms of drive implementation. Although obviously the second drive could be derived from the first motor, it is simpler and more reliable and cheaper to use two motors for the two functions.

The second motor has a positive action brake 68 on its shaft which is operated by the solenoid 70 to fix the trip member against rotation. The solenoid may of course be used to release the brake when it is desired to rotate the trip member. An interlock is included, whereby the motors, or at least the first motor 56, communicate with the solenoid through line 72 to insure that the brake is on when the first motor is on.

The rotisserie then basically has three modes of operation. In its normal mode, the orbital member 20 rotates about the frame axis and the trip member 54 is stationary, causing the rotators 30 to rotate as the orbital member rotates or orbits, incorporating the superimposed, dual rotary and orbital motion on the spits.

In the second mode of operation, the orbital member is maintained stationary, not with a brake, but merely by not driving its motor, and the trip member is rotated, causing the rotators to rotate in place, but without orbiting around the main frame axis. This mode would be used in case not all the spits were loaded, or in case some chickens required more heat than others, etc.

In the third mode, the motor 56, which is a reversible variable-voltage DC motor, is reversed, driving the orbital member backwards in a back-stepping mode. Obviously, this would be functionally virtually identical to its forward mode, with the rotary motion being super imposed on the orbital motion. Sometimes in the operation of rotisseries however, it is necessary to reverse the main spit rack for one reason or another.

In operation, the rotisserie is not only virtually foolproof and extremely reliable, but provides a visual attract mode to customers as well. The rotary pin wheel structure superimposed on the orbital motion of the spits looks very attractive in a restaurant window, so that the visual advantage presented by the rotisserie is superimposed onto the overall engineering advantage achieved by the simple, maintenance-free and foolproof construction.

It is hereby claimed:

1. A rotary orbital rotisserie comprising:
   (a) a frame defining a rotational frame axis;
   (b) an orbital member journaled to said frame to rotate about said frame axis and including a substantially circular angularly spaced rotational array of rotators each being rotatable about its own axis in said orbital member, with its own axis being parallel to said frame axis;
   (c) a trip member array rotatably mounted about said frame axis on said frame and including a substantially circular trip structure which at least periodically bears against said rotators such that mutual rotation between said orbital member and said trip member about said frame axis causes rotation of said rotators about their own axes, said trip member further including a first drive means for rotating said trip member about said frame axis;
   (d) rack structure individually engageable with said rotators to retain food to be cooked and to be rotated by an associated rotator;
   (e) said orbital member being freely rotatable about said frame axis of said frame and including second drive means for rotating said orbital member about said frame axis; and,
   (f) arresting means comprising a positive action brake mounted on said frame for releasably fixing said trip structure non-rotationally in said frame such that said orbital member may rotate while said trip structure remains stationary.

2. Structure according to claim 1 wherein said brake is releasable such that said trip structure has a fixed non-rotational mode and a rotational mode in which it is free to rotate about said frame axis, and said brake is interlocked with said second drive means such that when said second drive means is rotating said orbital member, said brake locks said trip structure into said fixed mode.

3. Structure according to claim 1 wherein said second drive means is reversible to cause said orbital member to reverse-rotate into a back-pedaling mode.

* * * * *